United States Patent [19]

Bonet et al.

[11] Patent Number: 5,101,344
[45] Date of Patent: Mar. 31, 1992

[54] DATA PROCESSOR HAVING SPLIT LEVEL CONTROL STORE

[75] Inventors: Luis A. Bonet; Tim A. Williams, both of Austin, Tex.

[73] Assignee: Motorola, Inc., Schaumburg, Ill.

[21] Appl. No.: 560,463

[22] Filed: Jul. 25, 1990

Related U.S. Application Data

[63] Continuation of Ser. No. 149,295, Jan. 28, 1988, abandoned.

[51] Int. Cl.⁵ ............................ G06F 9/28; G06F 9/38
[52] U.S. Cl. ................................. 395/375; 364/262.7; 364/262.8; 364/263.1; 364/DIG. 6
[58] Field of Search ... 364/200 MS File, 900 MS File

[56] References Cited

U.S. PATENT DOCUMENTS

| | | | |
|---|---|---|---|
| 3,735,363 | 5/1973 | Beers et al. | 364/200 |
| 3,766,532 | 10/1973 | Liebel, Jr. | 364/200 |
| 3,930,236 | 12/1975 | Ferguson et al. | 364/200 |
| 3,983,539 | 9/1976 | Faber et al. | 364/200 |
| 4,307,445 | 12/1981 | Tredennick et al. | 364/200 |
| 4,338,675 | 7/1982 | Palmer et al. | 364/200 |
| 4,360,868 | 11/1982 | Retter | 364/200 |
| 4,367,524 | 1/1983 | Budde et al. | 364/200 |
| 4,384,324 | 5/1983 | Kim et al. | 364/200 |
| 4,402,042 | 8/1985 | Guttag | 364/200 |
| 4,472,772 | 9/1985 | Flora | 364/200 |
| 4,713,750 | 12/1987 | Damouny et al. | 364/200 |
| 4,811,208 | 3/1989 | Myers et al. | 364/200 |
| 4,922,414 | 5/1990 | Holloway et al. | 364/200 |

Primary Examiner—Gareth D. Shaw
Assistant Examiner—John Loomis
Attorney, Agent, or Firm—Charlotte B. Whitaker

[57] ABSTRACT

A data processor having a split level control store structure, which partitions program memory into a macrocode portion and a microcode portion. The data processor contains two distinct machines, a macromachine and a micromachine. The macromachine includes an instruction sequence controller which detects the macrocode branch instruction before it is perceived by the micromachine, extracts from the branch instruction a macroaddress, and then provides the extracted macroaddress to the program memory as the next sequential instruction address. By "pipelining" the macromachine, the macromachine can "execute" the branch instruction in parallel with, and independent of, the execution by the micromachine of the preceeding instruction.

5 Claims, 5 Drawing Sheets

MICRO-OPERATION (μOP)

| Bits | Field |
|---|---|
| 1 | LOAD |
| 2 | NEXT |
| 3 | ACCDNTRL |
| 4 | R/W |
| 5 | FLAGS |
| 14 13 12 11 10 9 8 7 6 | SCHOIFTROL |
| 15 | ACCLD |
| 16 | AZERO |
| 19 18 17 | DESTINATIONS |
| 21 20 | SOURCES |
| 24 23 22 | MUXES |
| 26 25 | ALU |
| 27 | JUMP (0) |

MICRO-JUMP (μJUMP)

| Bits | Field |
|---|---|
| 1 | LOAD (0) |
| 2 | NEXT |
| 3 | x |
| 4 | x |
| 5 | A0 |
| 14 13 12 11 10 9 8 7 6 | A9 A8 A7 A6 A5 A4 A3 A2 A1 / JUMP ADDRESS |
| 15 | ACCLD (0) |
| 16 | x |
| 19 18 17 | CONDITIONS |
| 21 20 | x x |
| 24 23 22 | x x x |
| 26 25 | x x |
| 27 | JUMP (1) |

FIG. 3

DATA PROCESSOR HAVING SPLIT LEVEL CONTROL STORE

This application is a continuation of prior application Ser. No. 07/149,295 filed Jan. 28, 1988, now abandoned.

TECHNICAL FIELD

This invention relates generally to data processors and more particularly to a microprogrammable data processor having a split level control store.

BACKGROUND ART

In general purpose, microprogrammable data processors, various solutions have been proposed to facilitate code compression in the micromachine. For example, in the Intel 8087 microprocessor, described in U.S. Pat. No. 4,338,675, the micromachine implements a subroutine call microinstruction. In the Motorola MC68000 microprocessor, described in U.S. Pat. No. 4,307,445, the microinstruction ROM is split into a conventional sequencing portion and a compressed control portion. In U.S. Pat. No. 3,983,539, a full two-level control store architecture is provided. While such mechanisms may be utilized effectively in some applications, in other applications such solutions tend to require unnecessarily complex control circuitry or may be excessively slow.

SUMMARY OF THE INVENTION

Accordingly, it is an object of the present invention to provide a microprogrammed data processor that can execute selected branch macroinstructions in parallel with the preceding macroinstruction.

Yet another object is to provide a microprogrammed data processor that can perform selected branch macroinstructions without using the micromachine.

These and other objects are achieved in a data processor which executes each of a selected sequence of instructions provided by an instruction memory in response to a corresponding sequence of instruction addresses. In the preferred form, the data processor comprises: an instruction register for receiving each of the instructions provided by the instruction memory; an instruction execution unit for executing each of the instructions received by the instruction register; and an instruction sequence controller for providing the next sequential instruction address to the instruction memory in response to the execution of each of the instructions by the instruction execution unit. In accordance with the present invention, the data processor includes first logic, for detecting when the instruction received by the instruction register is of a selected type; second logic, for extracting from said detected instruction a selected next instruction address; and third logic, for providing said extracted next instruction address to said instruction memory as said next sequential instruction address.

BRIEF DESCRIPTION OF THE DRAWINGS

FIG. 3 illustrates the format for different types of microcode words, as employed in the present invention;

DESCRIPTION OF THE INVENTION

Figure 1:
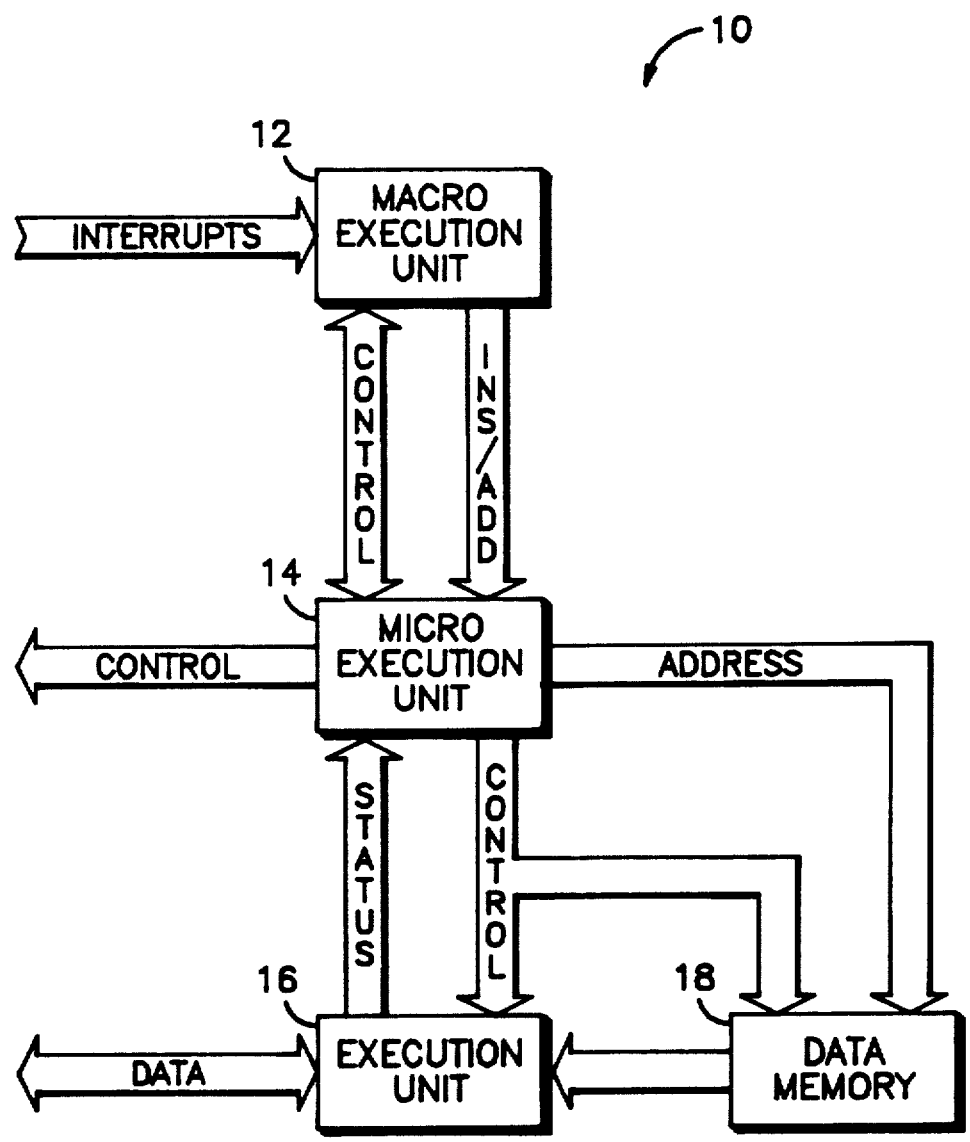
FIG. 1 illustrates in block diagram form a data processor in accordance with the present invention.

Shown in FIG. 1 is an data processor (DP) 10 which comprises a macrocode execution unit (MECU) 12, a microcode execution control unit (uECU) 14, a conventional execution unit (EU) 16, and a conventional data memory 18. In the preferred form, DP 10 is an interpretive microcoded machine with a split control store structure. The use of a split control store architecture, which partitions the program memory into a macrocode portion and a microcode portion, is substantially more efficient than straight line coding certain algorithms at the microcode level. For example, in conventional split control store architectures, frequently executed routines need only be implemented once at the microcode level. These routines may then be invoked several times by making "calls" from the macrocode level. In accordance with the present invention, the MECU 12 is provided with the capability of executing a special "jump" macroinstruction independent of the uECU 14. Using this "jump" macroinstruction, the transition from one routine to another may be made with no extra micromachine cycles since this transition can be pipelined and performed independent of the uECU 14. By requiring that the macrocode jump conditions be independent of microcode sequencing information, such jumps may be performed before the completion of the currently-executing microcode routine, thereby substantially reducing the number of overhead (i.e., noncomputational) cycles.

Figure 2:
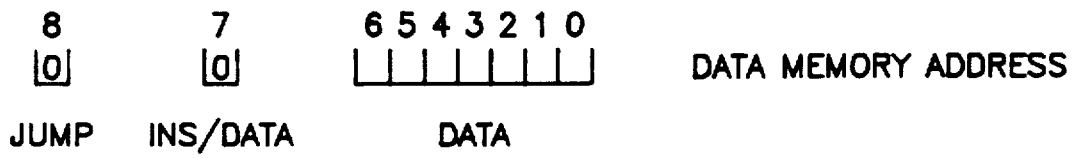
FIG. 2 illustrates the format for different types of macrocode words, as employed in the present invention.
Figure 2:
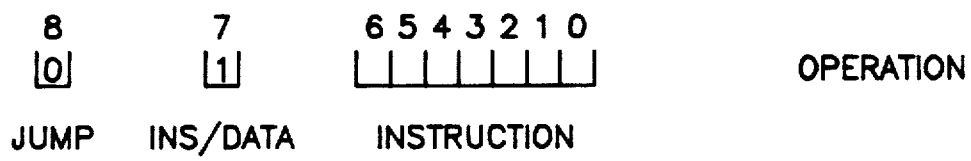
Figure 2:
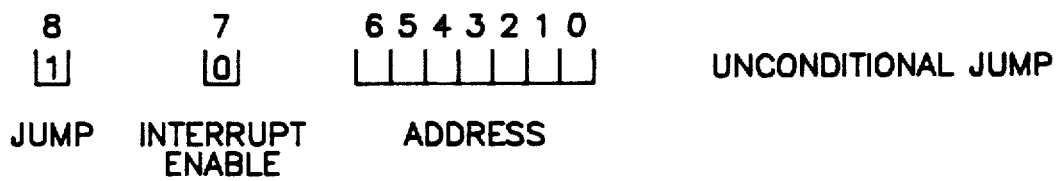
Figure 2:

In the preferred form shown in FIG. 1, the MECU 12 generally initiates operation in response to an INTERRUPT signal received from an external source (not shown). In response to the INTERRUPT signal, the MECU 12 starts fetching the macrocode words comprising the appropriate interrupt service routine beginning at a starting address selected by an INTERRUPT VECTOR, also provided by the external source (not shown). Since the MECU 12 is itself "pipelined", the "first" macrocode word of the routine will be provided to the uECU 14 as the "next" macrocode word in the routine is being fetched. Thus, except for the initial delay in fetching the "first" macrocode word of the interrupt service routine, the MECU 12 will already have the next macrocode word available when the uECU 14 requests it. As shown in FIG. 2, the macrocode words may be any of four types: data memory address (DMA), operation (OP), unconditional jump (JUMP), and jump-on-no-interrupt (JNINT). Since the DMA macrocode word is effectively a literal, only the OP, JUMP and JNINT macrocode words are considered to be macroinstructions.

Typically, while the MECU 12 is "idling" awaiting the next interrupt, uECU 14 will also be in an "idle" state, during which it will be continuously requesting the "next" macroinstruction. When the MECU 12 provides a macroinstruction, the uECU 14 will "translate" it into a corresponding microcode start address. If, instead, the MECU 12 provides a data memory address, the uECU 14 will store the data memory address for use by the EU 16. In general, each macroinstruction is implemented by a selected sequence of microinstructions.

As shown in FIG. 3, the microinstructions may be either of two forms: micro-operation (uOP) and micro-jump (uJUMP).

During execution of certain microinstructions, the uECU 14 will assert a control signal to the MECU 12 requesting the "next" macroinstruction, so that the "next" macroinstruction will be available before the execution of the last microinstruction of the "current" macroinstruction. As necessary, the uECU 14 may also assert a different control signal to request the MECU 12 to provide the data memory address that follows the current macroinstruction. This "pre-fetching" of the next macrocode word maximizes the throughput and minimizes the execution time of each microroutine.

In operation, the uECU 14 directly controls the operation of the EU 16. In the preferred form, the EU 16 employs a 16-bit input/output (I/O) data bus to move information between its internal registers and the data memory 18. Condition flags representing the status of EU operations (e.g., zero result, positive result, carry-out) may be selectively transferred to the uECU 14 to control the selection of the next microcode instruction.

Figure 4:
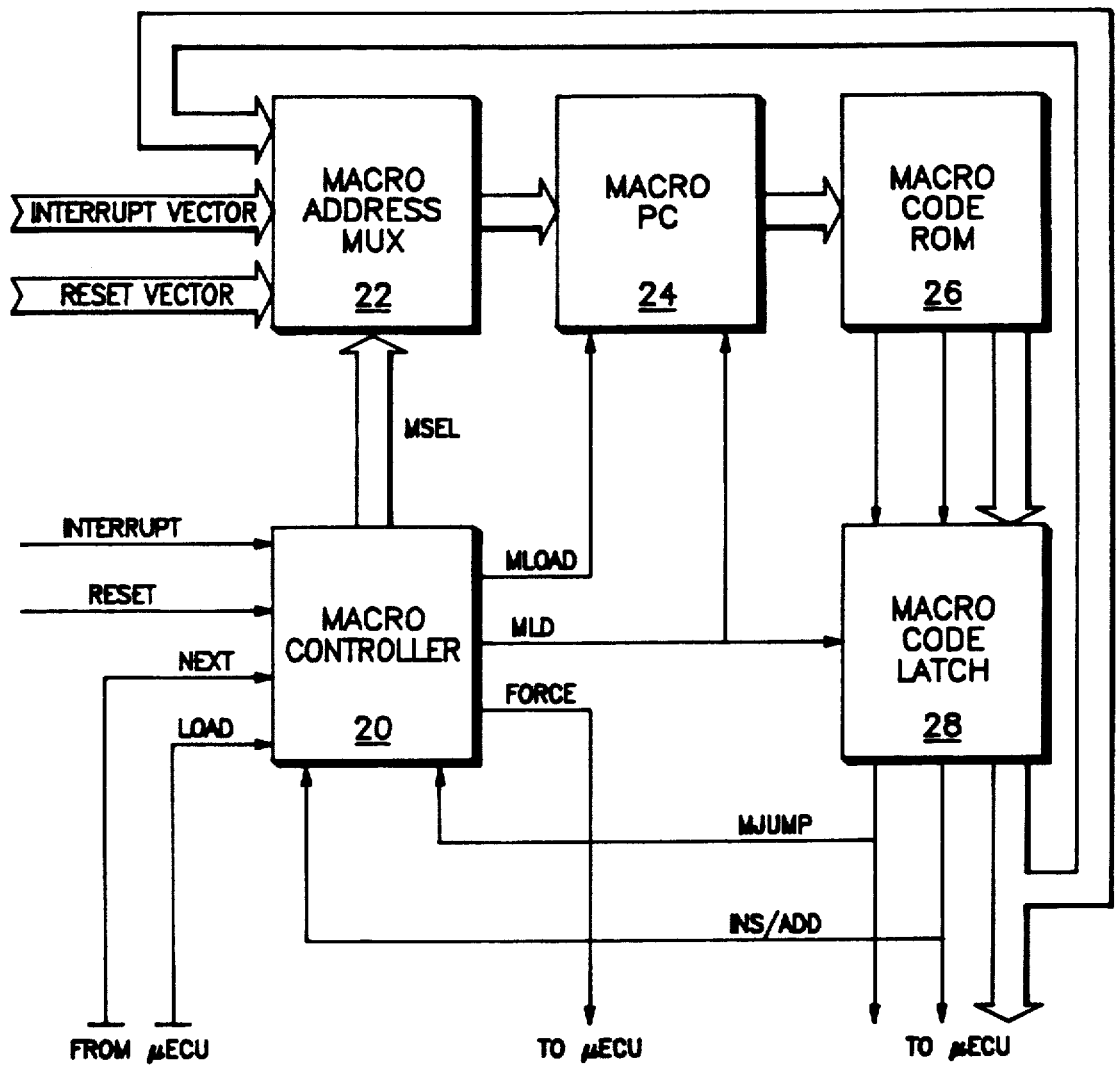
FIG. 4 illustrates in block diagram form a macrocode execution unit of the data processor of FIG. 1, in accordance with the present invention.

In the preferred embodiment shown in FIG. 4, the macrocode execution unit (MECU) 12 is comprised generally of a macro controller 20, a macroaddress mux 22, a macro pc 24, a macrocode ROM 26, and a macrocode latch 28. Since DP 10 is interrupt driven, the MECU 12, after servicing the "last" interrupt, will enter an "idle" state awaiting the "next" interrupt. In this state, the "last" macroinstruction of the "current" routine will be a JNINT macroinstruction which contains an "interrupt enable bit" (see, FIG. 2). Whenever the macro controller 20 detects that a JNINT macroinstruction is in the macrocode latch 28, the macro controller 20 will assert a MSEL signal to enable the macroaddress mux 22 to transfer the "macrojump" macroaddress portion of the macroinstruction currently in the macrocode latch 28 to the macro pc 24. The macro controller 20 then asserts an MlOAD signal to enable the macro pc 22 to load the macrojump macroaddress. After the macrocode ROM 26 has had sufficient time to provide the macrocode word stored at the macrojump macroaddress, the macro controller 20 will assert an MLD signal to latch the next macrocode word in the macrocode latch 28. In response to the MLD signal, the macro pc 24 will increment the "current" macroaddress so that the macrocode ROM 26 can begin to "pre-fetch" the next macrocode word.

Since the macrojump macroaddress is typically the address of the JNINT macroinstruction itself, the MECU 12 effectively "idles" awaiting the next INTERRUPT signal. When the macro controller 20 receives the INTERRUPT signal, it first asserts the MSEL signal to enable the macroaddress mux 22 to transfer the INTERRUPT VECTOR to the macro pc 24, and then asserts the MLOAD signal to enable the macro pc 24 to load the INTERRUPT VECTOR. After the macrocode ROM 26 has provided the macrocode word stored at the macrocode address specified in the macro pc 24, the macro controller 20 asserts the MLD signal to latch the next macroword into the macrocode latch 28 and increment the macroaddress in the macro pc 24. Thereafter, the MECU 12 will continue to provide each successive macrocode word in the macro routine to the uECU 14 in response to receiving a request from the uECU 14 for the "next" macrocode word.

Figure 5:
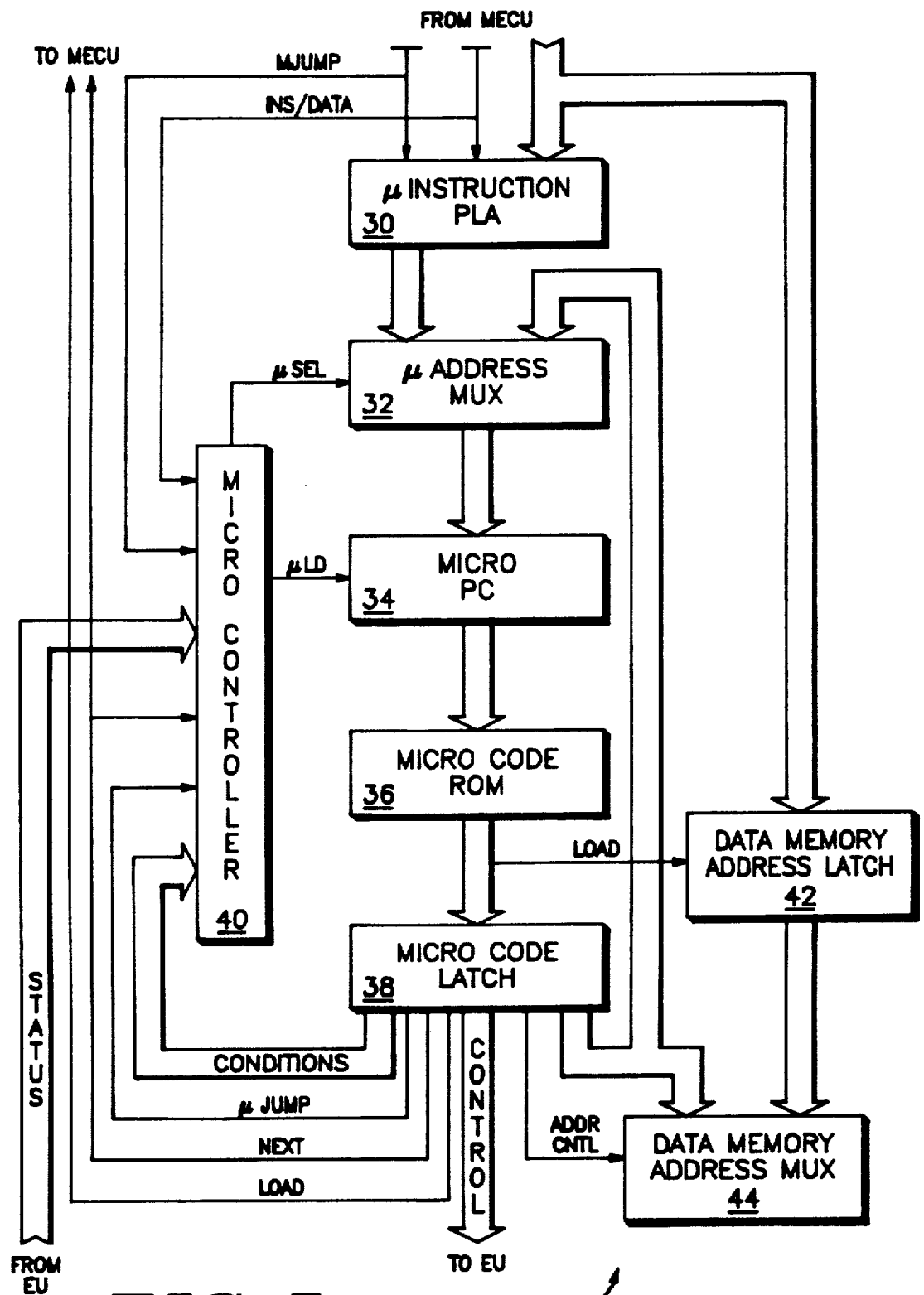
FIG. 5 illustrates in block diagram form a microcode execution unit of the data processor of FIG. 1, in accordance with the present invention.

In the preferred form shown in FIG. 5, the uECU 14 is comprised of a microinstruction PLA 30, a microaddress mux 32, a micro pc 34, a microcode ROM 36, a microcode latch 38, and a micro controller 40. To facilitate the transfer of data memory addresses from the MECU 12 to the EU 16, the uECU 14 also includes an data memory address latch 42 and a data memory address mux 44. As in a conventional micromachine, the microinstruction PLA 30 will attempt to decode each macrocode word provided by the MECU 12, and to generate the starting microaddress for the corresponding microroutine. However, only if the micro controller 40 detects that the macrocode word in the macro latch 28 is a macroinstruction, will the micro controller 40 assert a uSEL signal to enable the microaddress mux 32 to transfer that starting microaddress to the micro pc 34. Simultaneously, the micro controller 40 asserts a uLD signal to enable the micro pc 34 to load the starting microaddress. At the start of the next microcycle, after the microcode ROM 36 has had sufficient time to resolve, the micro latch 38 will automatically latch the microcode word provided by the microcode ROM 36.

If the microcode word latched in the micro latch 38 is of the uOP form, the micro controller 40 will negate the uLD signal, and, in response, the micro pc 34 will simply increment the current microaddress. If, however, the microcode word is of the unconditional uJUMP form, the micro controller 40 will assert the uSEL signal to enable the microaddress mux 32 to transfer the "micro jump" microaddress provided by the micro latch 38 to the micro pc 34, and, then, assert the uLD signal to latch that "micro jump" microaddress into the micro pc 34. If, on the other hand, the microcode word is of the conditional uJUMP form, the micro controller 40 will assert the uSEL signal to enable the microaddress mux 32 to transfer the "micro jump" microaddress provided by the micro latch 38 to the micro pc 34 only if the several status signals provided by the EU 16 indicate that the conditions specified in the microcode word are satisfied. The micro controller 40 will then assert the uLD signal to latch that "micro jump" microaddress into the micro pc 34.

Since each microinstruction sequence is essentially an extension of the corresponding macroinstruction and is created substantially simultaneously, the micro sequences "know" when the associated macroinstruction will need to pass a data memory address to the EU 16. To enable this transfer, the uOP form of microcode word includes a LOAD bit, which, when set, indicates that a transfer should be performed. When the microcode ROM 36 provides a microcode word having the LOAD bit set, the data memory address latch 42 will latch the data memory address that has already been "pre-fetched" by the MECU 12. When that microcode word is thereafter latched in the micro latch 38, a LOAD signal is asserted to enable the MECU 12 to "pre-fetch" the next macrocode word.

As can be seen in FIG. 3, both types of microcode word contain a NEXT bit which, when set, indicates that the "next" macroinstruction needs to be requested. When a microcode word having the NEXT bit set is latched in the microcode latch 38, the NEXT signal is asserted to enable the MECU 12 to "pre-fetch" the next macroinstruction.

Although the present invention has been shown and described in the context of a particular form of data processor, various changes and modifications may be made in the preferred embodiment as disclosed herein without departing from the spirit and scope of the present invention. For example, the MECU 12 may be utilized effectively with virtually any desired form of uECU 14. Further, the form of the EU 16 and the presence or absence of the data memory 18 are not pertinent to the present invention. Of course, the MECU 12 itself may be modified in various ways, as desired, so long as it retains the ability to detect and effect macrojumps independent of the other elements of the data processor 10.

We claim:

1. In a microprogrammed data processor having a micromachine for executing each of a selected sequence of macroinstructions provided by a macroinstruction memory, in response to a corresponding sequence of macroinstruction addresses, whereby the execution of each macroinstruction is accomplished by the micromachine executing a selected sequence of microinstructions, the data processor comprising:
  macroinstruction register means in a macromachine for receiving each of said macroinstructions provided by said macroinstruction memory;
  macroinstruction execution means in said micromachine for executing each of said macroinstructions, received by said macroinstruction register means, by executing said selected sequence of microinstructions;
  macroinstruction sequence control means in said macromachine for providing a next sequential macroinstruction address to said macroinstruction memory in response to the execution of each of said macroinstructions by the macroinstruction execution means;
the improvement wherein the macroinstruction sequence control means includes:
  first means for receiving an external interrupt signal, and for initiating the execution of a predetermined selected sequence of macroinstructions in response thereto, said first means detecting when a current macroinstruction received by the macroinstruction register means is of a selected type, and providing a first control signal when said current macroinstruction is of said selected type, said first means subsequently providing a second control signal;
  second means for transferring a selected portion of said current macroinstruction of said selected type, in response to receiving said first control signal, said selected portion comprising a selected next macroinstruction address, said second means determining said selected next macroinstruction address independent of, and in parallel with the execution by said macroinstruction execution means of said current macroinstruction; and
  third means for receiving said selected portion of said current macroinstruction address, in response to said second control signal and for providing said selected portion of said current macroinstruction address to said macroinstruction memory as said next sequential macroinstruction address, independent of, and in parallel with the execution by said macroinstruction execution means of said current macroinstruction, in response to a third control signal provided by said first means.

2. A data processor as set forth in claim 1 wherein the first means comprise a macroinstruction address controller coupled to the macroinstruction register means, the macroinstruction address controller providing the first control signal, in response to detecting in said macroinstruction register means said current macroinstruction of said selected type and subsequently providing the second and third control signals, independent of, and in parallel with the execution by said macroinstruction execution means of said current macroinstruction.

3. A data processor as set forth in claim 2 wherein the second means comprise a macroinstruction address mux coupled to the macroinstruction register means and to the macroinstruction address controller, the macroinstruction address mux transferring the selected portion of the current macroinstruction in the macroinstruction register means when said current macroinstruction is of the selected type.

4. A data processor as set forth in claim 3 wherein the third means comprise a macroinstruction program counter coupled to the macroinstruction address mux, the macroinstruction address controller and the macroinstruction memory, the macroinstruction program counter latching said selected portion in response to said second control signal, and providing said selected portion to said macroinstruction memory as said next sequential macroinstruction address, independent of, and in parallel with the execution by said macroinstruction execution means of said current macroinstruction.

5. In a microprogrammed data processor having a micromachine capable of executing each of a selected sequence of macroinstructions provided by a macroinstruction memory in response to a corresponding sequence of macroinstruction addresses, whereby the execution of each macroinstruction is accomplished by the micromachine executing a selected sequence of microinstructions, the data processor comprising:
  macroinstruction register means in a macromachine for receiving each of said macroinstructions provided by said macroinstruction memory;
  macroinstruction execution means in said micromachine for executing each of said macroinstructions received by said macroinstruction register means, by executing said selected sequence of microinstructions; and
  macroinstruction sequence control means in said macromachine for providing a next sequential macroinstruction address to said macroinstruction memory in response to the execution of each of said macroinstructions by the macroinstruction execution means, the macroinstruction sequence control means comprising:
    a macroinstruction address controller coupled to the macroinstruction register means, for receiving an interrupt signal and initiating the execution of a predetermined selected sequence of macroinstructions in response thereto, the macroinstruction address controller providing a first control signal and subsequently providing a second control signals, independent of, and in parallel with the execution by said macroinstruction execution means of said current macroinstruction, in response to detecting in said macroinstruction register means a current macroinstruction of a selected type;
    a macroinstruction address mux coupled to the macroinstruction register means and to the macroinstruction address controller, the macroinstruction address mux transferring a selected portion of the current macroinstruction of the selected type in the macroinstruction register means in response to said first control signal provided by the macroinstruction address controller, said selected portion comprising a jump macroaddress; and a macroinstruction program counter coupled to the macroinstruction address mux, the macroinstruction address controller and the macroinstruction memory, the macroinstruction program counter latching said selected portion in response to said second control signal, and providing said selected portion to said macroinstruction memory as said next sequential macroinstruction address, independent of, and in parallel with the execution by said macroinstruction execution means of said current macroinstruction, in response to a third control signal.

* * * * *